United States Patent [19]
Togi et al.

[11] Patent Number: 5,272,855
[45] Date of Patent: Dec. 28, 1993

[54] PROCESS AND APPARATUS FOR MANUFACTURING FLUID CONTAINER

[75] Inventors: Toshihide Togi; Kuniyasu Ohara; Tadahiro Kojima; Masatoshi Fujima; Tatuo Furuse, all of Tokyo; Kiyoshi Tsuzuki; Shigenobu Sato, both of Kanagawa, all of Japan

[73] Assignee: Toppan Printing Co., Ltd., Tokyo, Japan

[21] Appl. No.: 924,514

[22] Filed: Aug. 4, 1992

[30] Foreign Application Priority Data

Aug. 6, 1991 [JP] Japan .................... 3-219339
Dec. 28, 1991 [JP] Japan .................... 3-359140
Apr. 4, 1992 [JP] Japan .................... 4-110738

[51] Int. Cl.⁵ .............................. B65B 61/00
[52] U.S. Cl. ............................ 53/410; 53/449; 53/133.2; 53/175; 493/87; 493/96
[58] Field of Search ............ 53/410, 133.2, 449, 53/175; 493/87, 213, 96

[56] References Cited

U.S. PATENT DOCUMENTS

| | | |
|---|---|---|
| 2,981,443 | 4/1961 | Baldwin . |
| 3,605,578 | 9/1971 | Sternau ................. 493/87 |
| 4,779,397 | 10/1988 | Christine ............ 53/133.2 |
| 4,788,811 | 12/1988 | Kawajiri ............. 53/133.2 |
| 4,836,923 | 6/1989 | Okushita ............... 493/87 |
| 5,058,360 | 10/1991 | Yamazaki ............ 53/133.2 |
| 5,087,235 | 2/1992 | Lafleur . |

FOREIGN PATENT DOCUMENTS

| | | |
|---|---|---|
| 0034824 | 9/1981 | European Pat. Off. . |
| 0107474 | 5/1984 | European Pat. Off. . |
| 0450146 | 10/1991 | European Pat. Off. . |
| 2238287 | 5/1991 | United Kingdom ....... 53/133.2 |

*Primary Examiner*—John Sipos
*Attorney, Agent, or Firm*—Armstrong, Westerman, Hattori, McLeland & Naughton

[57] ABSTRACT

A process for manufacturing a fluid, including the steps of punching spout or outlet plug fitting holes in both a plate of a tubular blank of the carton and a plastic film constituting the internal bag at a predetermined place where a spout or outlet plug is attached to the tubular blank and the internal bag, the tubular blank containing the plastic film and having a closed bottom wall, fitting the spout or outlet plug in the spout or outlet plug fitting holes from inside the tubular plug, and welding the spout or outlet plug to the plastic film. An apparatus of manufacturing a fluid container, including a circulating conveyor conveying a tubular blank of the carton, the tubular blank containing a plastic film constituting the internal bag, and having a closed bottom wall, a punch cutting spout or outlet plug fitting holes in predetermined portions of a plate of the tubular blank and the plastic film which have been delivered by the circulating conveyor to a predetermined place, and a spout or outlet plug welder provided downstream of the punch and welding the spout or outlet plug which has been fitted in the spout or outlet plug fitting holes to the tubular blank and the plastic film which have been delivered by the circulating conveyor to a predetermined place.

6 Claims, 15 Drawing Sheets

PROCESS AND APPARATUS FOR MANUFACTURING FLUID CONTAINER

BACKGROUND OF THE INVENTION

1. Field of the Invention

The present invention relates to a process and an apparatus for manufacturing the so-called bag-in-box type fluid container in which a carton contains an internal bag and the internal bag receives a content (i.e. a fluid such as a liquid or fine particles and especially the liquid)

2. Description of the Related Art

Hitherto, Japanese examined utility model application publication SHO.62-15154 and Japanese examined patent application publication SHO.63-57281 disclose manufactures of such fluid container.

In the former, a spout-holding portion provided beforehand in a flap of an external box (i.e. carton) holds a base end of a spout of an internal bag. After the internal bag which has been filled with a content is placed in the external box, flaps are folded inward so that the base end of the spout is fitted in the spout holding portion.

In the latter, an internal bag is stuck to a blank of a carton so that a spout (previously closed and opened when the internal bag is filled with a content) of the internal bag is fitted in an opening in the blank, and the blank is then stuck in the form of a sack, and this blank is then raised and forms a container, and the container is then filled with the content.

In the above-described container of the former in which the spout-holding portion of the flap support the spout, the spout must be fastened using a jig when the flaps are folded inward so that the spout is fitted in the spout-holding portion. Thus, there are drawbacks that a process for manufacturing the fluid container is complicated and that the size of a fluid container manufacturing plant is large.

In the above-described fluid container of the latter into which a tube (i.e. a carton of which the top and bottom walls have been not yet formed) to which the internal bag has been bonded is raised and built and which is filled with the content, an assembly line of steps of die-cutting a hole in the blank, sticking the internal bag and sticking the blank in the form of a sack is separate from an assembly line of subsequent steps of forming the container and filling the container with the content (e.g. since the processing speed of antecedent step of the process such as the blank sticking step is largely different from that of the subsequent step such as the container forming step or the two assembly lines are placed in different factories).

Therefore, the carton (i.e. tube) having the spout and produced in the antecedent step is carried to the subsequent steps. This case entails a drawback in the tubular carton is bulky because of its projecting spout so that the efficiency of transfer of a large number of tubular cartons is low and so that the number of tubular cartons charged on the subsequent step cannot be large.

SUMMARY OF THE INVENTION

The present invention was made in view of the above-described situation.

A primary object of the present invention is to provide a process and apparatus for manufacturing a fluid container which increases the efficiency of a transfer of flattened blanks lacking spouts or outlet plugs from an antecedent step to a subsequent step of the process and the number of the flattened blanks loaded on the subsequent step and simplifies the overall arrangement of the process for manufacturing the fluid container.

Another object of the present invention is to provide a process and apparatus for manufacturing a fluid container in which a use of a system feeding flattened blanks lacking spouts or outlet plugs from an antecedent step to a subsequent step of the process enables the tubular blanks at the subsequent step to become fluid containers having the spouts or outlet plugs and thereby enable the fluid containers to be filled with a fluid content.

In order to achieve the above objects, a first aspect of the present invention is a process for manufacturing a fluid container, the fluid container including a carton, an internal bag provided in the carton, and a spout extending outward from the carton, the process comprising the steps of punching spout fitting holes in both a plate of a tubular blank of the carton and a plastic film constituting the internal bag at a predetermined place where the spout is attached to the tubular blank and the plastic film, the tubular blank containing the plastic film and having a closed bottom wall, fitting the spout in the spout fitting holes from inside the tubular blank, and welding the spout to the plastic film.

A second aspect of the present invention is an apparatus of manufacturing a fluid container, the fluid container including a carton, an internal bag provided in the carton, and a spout extending outward from the carton, the apparatus comprising a circulating conveyor conveying a tubular blank of the carton, the tubular blank containing a plastic film constituting the internal bag and having a closed bottom wall, a punch cutting spout fitting holes in predetermined portions of a plate of the tubular blank and the plastic film which have been delivered by said circulating conveyor to a predetermined place, and a spout welder provided downstream of said punch and welding a spout which has been fitted in the spout fitting holes to the tubular blank and the plastic film which have been delivered by said circulating conveyor to a predetermined place.

A third aspect of the present invention is a process for manufacturing a fluid container, the fluid container including a carton, an internal bag provided in the carton, and an outlet plug extending outward from the carton, the process comprising the steps of punching an outlet plug fitting holes in both a plate of a tubular blank of the carton and a plastic film constituting the internal bag at a predetermined place where an outlet plug is attached to the tubular blank, the tubular blank containing the plastic film and a closed bottom wall, fitting the outlet plug in the outlet plug fitting holes from inside the tubular blank, welding the outlet plug to the plastic film, filling the internal bag with a fluid from above the tubular blank, and sealing the top end of the internal bag which has been filled with the fluid in the tubular blank.

A fourth aspect of the present invention is an apparatus of manufacturing a fluid container, the fluid container including a carton, an internal bag provided in the carton, and an outlet plug extending outward from the carton, the apparatus comprising a circulating conveyor conveying a tubular blank of the carton, the tubular blank containing a plastic film constituting the internal bag and having a closed bottom wall, a punch cutting an outlet plug fitting holes in predetermined portion of a plate of the tubular blank and the plastic film which have been delivered by said circulating conveyor to a predetermined place, and an outlet plug welder provided downstream of said punch and welding the outlet plug which has been fitted in the outlet plug fitting holes, to the tubular blank and the plastic film which have been delivered by said circulating conveyor to a predetermined place, a charger filling the internal bag with a fluid in the tubular blank from above the tubular blank, and a heatsealer sealing the top end of the internal ba which has been filled with the fluid in the tubular blank.

In the present invention, the flattened blank in which the blank containing the internal bag of plastic film has been stuck in the form of a sack is fed beforehand from an antecedent step of a process, the flattened blank is then raised and converted into a block-shaped tubular blank defining a block-shaped internal space and the bottom wall of the tubular blank is then closed. In the container manufacturing process of the present invention, the fluid container is produced from the tubular blank having the closed bottom wall, and the spout or outlet plug fitting hole is opened in an upper portion of the tubular blank, and an associated spout or outlet plug is fitted in the spout or outlet plug fitting hole. The spout or outlet plug is welded to the tubular blank and the plastic film, the top wall of the tubular blank is then closed to produce the fluid container having the spout or outlet plug and containing the internal bag.

Thus, since the spout or outlet plug is fitted in the tubular blank and the plastic film in the subsequent step from the raising of the flattened blank to the closing of the top wall of the container, a stock control and a transport control can be achieved at a high accumulation efficiency using the flatness of the flattened blank manufactured on the antecedent step. Thus, a large number of flattened blanks can be easily loaded on a subsequent step of the process commencing with the raising of the flattened blank.

Since the container top wall is closed after the spout or outlet plug is welded to the tubular blank and the plastic film, the fluid container manufacturing process of the present invention requires no conventional folding of flaps while the spout is retained, and allows a simplified mechanical plant for manufacturing the fluid container. In addition, since the carton and the internal bag of plastic film are concurrently punched to produce the spout or outlet plug fitting holes, the alignment of the carton and the internal bag requires no high accuracy. In addition, since the spout or outlet plug is solely fitted in the spout or outlet plug fitting holes, the positional relation of the carton and the internal bag requires less care in producing the spout or outlet plug than that in the conventional fluid container having a structure in which the spout and the internal bag are united.

BRIEF OF THE DRAWINGS

Figure 22:
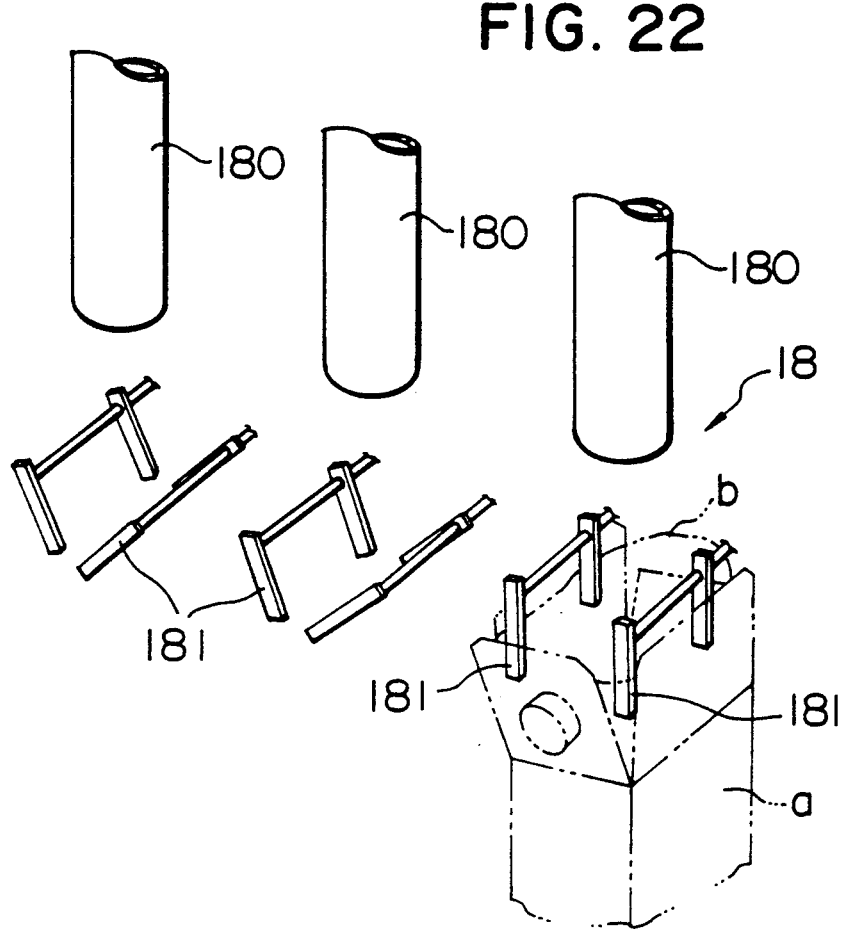
Figure 23:
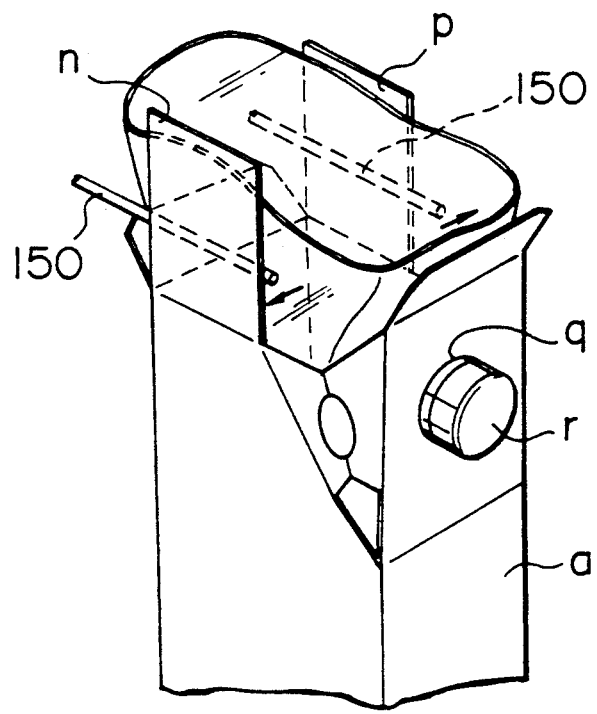
Figure 24:
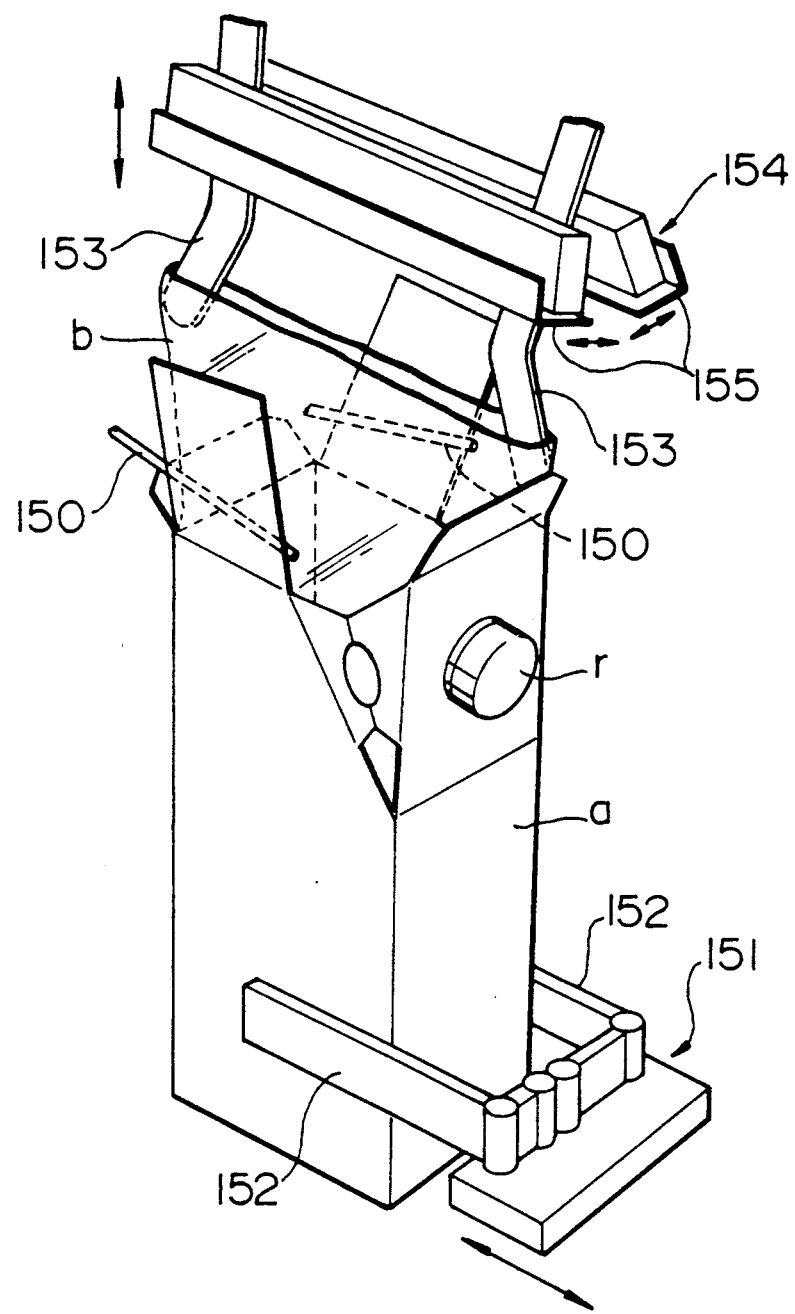

FIG. 22 a content charging step;

FIG. 23 illustrates an opening of top flaps of the tubular blank by a top film-sealer unit;

FIG. 24 illustrates the operation of a clamp of the top film-sealer unit; and

Figure 25:
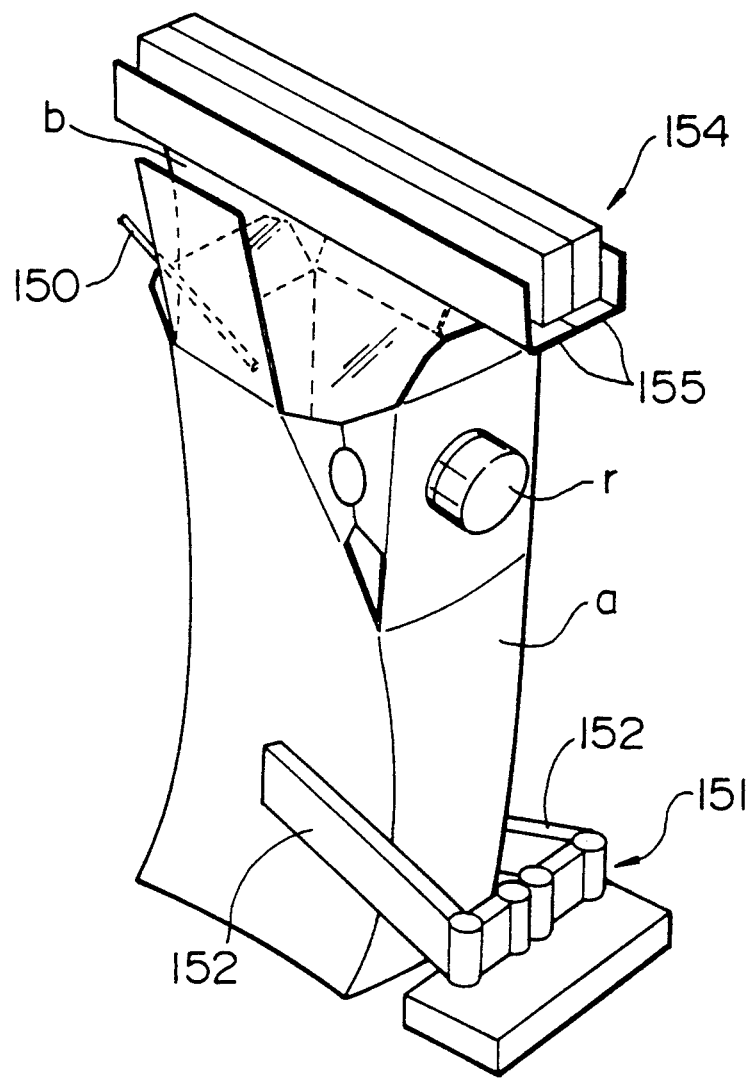

FIG. 25 illustrates a sealing of the top flaps by the top film-sealer unit.

DESCRIPTION OF THE PREFERRED EMBODIMENTS

Preferred embodiments of the present invention will be described with reference to the drawings hereinafter. FIGS. 1-18 illustrate a first embodiment of the present invention.

Figure 1:
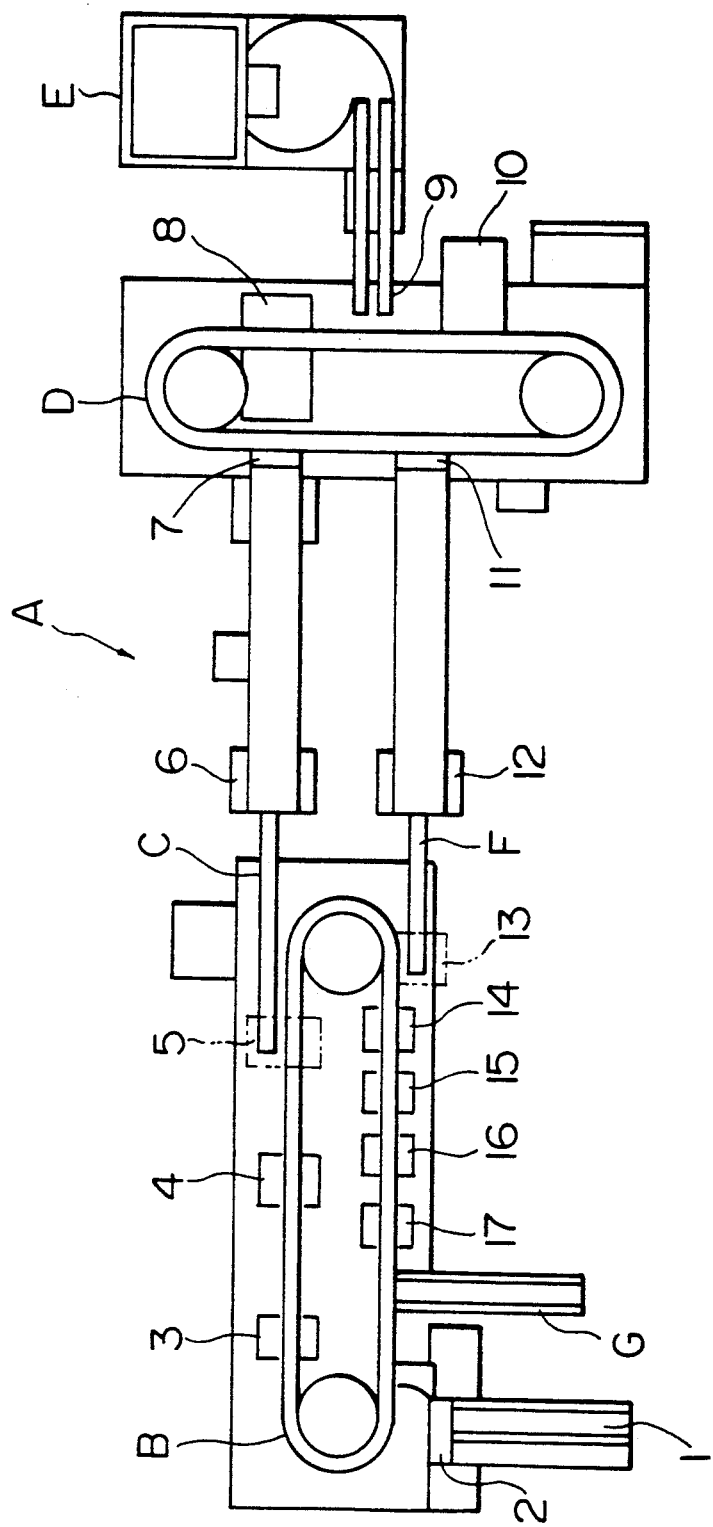
FIG. 1 is a schematic diagram of an apparatus of producing a fluid container carrying out a process for producing a fluid container according to a first embodiment of the present invention.
Figure 2:
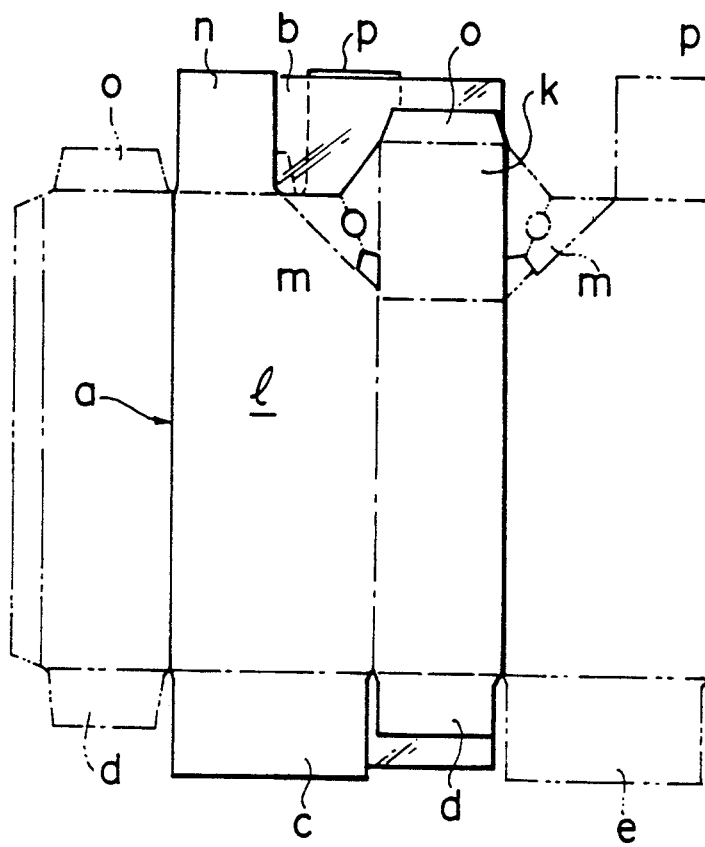
FIG. 2 illustrates a flattened blank in solid lines and an expanded phantom lines.

FIG. 1 shows an apparatus A of manufacturing a fluid container. When flattened blanks are fed to the manufacturing apparatus A, the manufacturing apparatus A works the flattened blanks while transferring them and finally discharges a fluid container which has been manufactured in the form of a container with a spout fitted.

Numeral 1 denotes a carton stacker 1 faced perpendicularly to a conveyance chain B having a plurality of receivers. The above-described flattened blanks manufactured at antecedent steps of a fluid container manufacturing process are charged on the carton stacker 1. A carton feeder 2 provided at the front end of the carton stacker 1 delivers to the conveyance chain B a row of flattened blanks which has been charged on the carton stacker 1 sequentially from one arranged at the front end of the row. During the delivery, the flattened blanks are raised and form essentially block-shaped tubular blank defining block-shaped interior space. The conveyance chain B conveys the block-shaped tubular blanks in their erect positions.

Figure 3:
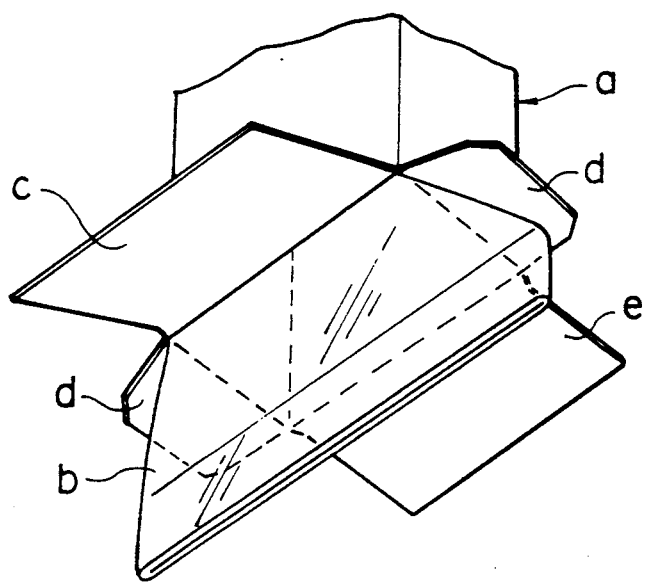
FIG. 3 illustrates an extending of a plastic film by a bottom film-sealer of the apparatus of FIG. 1.
Figure 4:
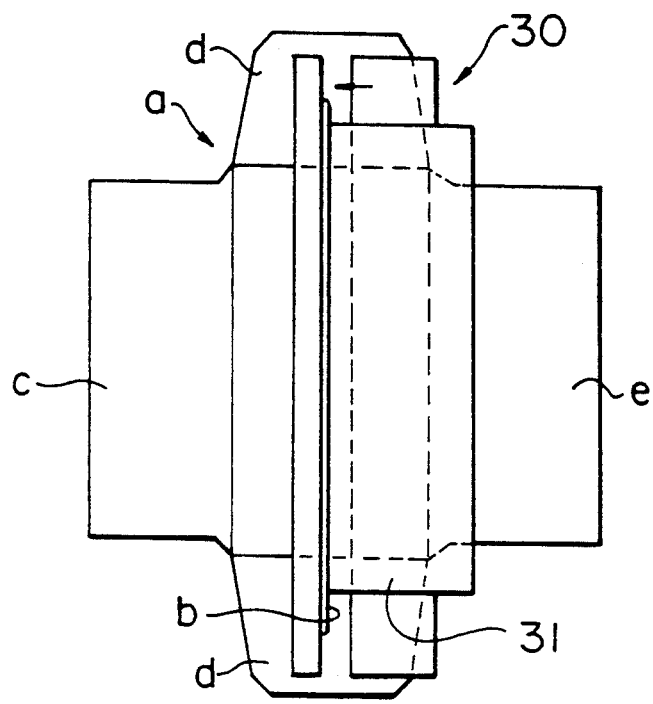
FIG. 4 illustrates a sealing of the plastic film by the bottom unit.
Figure 5:
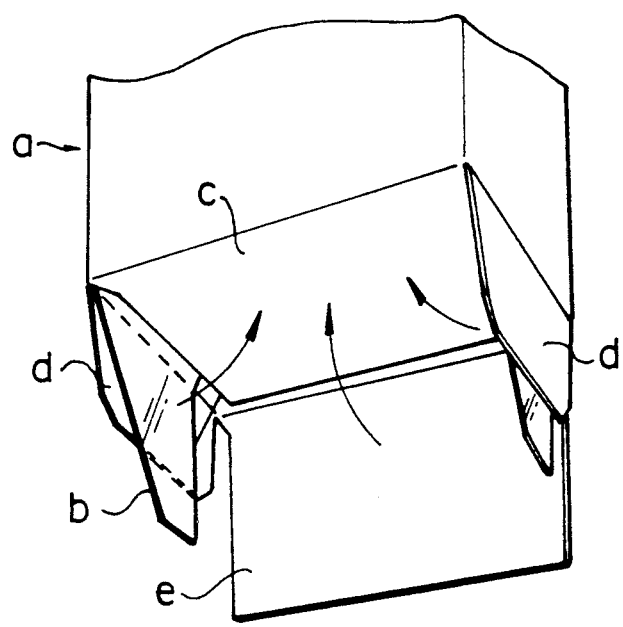
FIG. 5 illustrates a folding of bottom flaps of the tubular blank by a container bottom wall former unit.

The carton feeder 2 have, for example, a vacuum sucker and a mechanism sucking the flattened blanks and drawing out them while contacting them to a guide, to raise the block-shaped tubular blanks. The raised tubular blanks are placed the receivers of the conveyance chain B, respectively. Numeral 3 denotes a bottom film-sealer which folds bottom flaps of each tubular blank inward to pretreat it for closing the container bottom wall. For example, this operation is as follows: The bottom end of a tubular plastic film b in the tubular blank a is extended transversely to the longitudinal axis of the tubular blank as shown in FIG. 3. A sealer 30 then closes. At a time a film retainer 31 retains the film b, the sealer 30 stops once. The sealer 30 then closes again for the film sealing, as shown in FIG. 4.

A container bottom wall former unit 4 is arranged downstream of the bottom film-sealer 3 and aligns therewith. The container bottom wall former unit 4 folds the bottom flaps of the tubular blank a inward and fastens them by means of a hot melt adhesive application. In this operation, an extending of a folding lever or the like (or the operation of a guide) folds a large flap c of the bottom wall of the tubular blank a inward and an extending of the folding lever folds right and left small flaps d over the large flap c. A remaining large flap e has an applied hot melt adhesive and is folded over the large flaps c and the small flap d to be fastened to the large and small flaps c and d. The above-described sealing of the plastic film b and the folding of the flaps c, d and e close and form the container bottom wall.

A deliverer 5 transfers bottomed tubular blanks from the conveyance chain B to a single inline conveyor C. A sorter 6 provided intermediate the single inline conveyor C sorts the bottomed tubular blanks being transferred by the single inline conveyor C into two rows of bottomed tubular blanks. A deliverer 7 provided downstream of the single inline conveyor C transfers pairs of tubular blanks of the two rows to a dual inline conveyor D. During the conveyance of the pairs of tubular blanks by the dual inline conveyor D, spout fitting holes are opened and spouts are welded to the tubular blanks and the plastic film b as described below.

Figure 6:
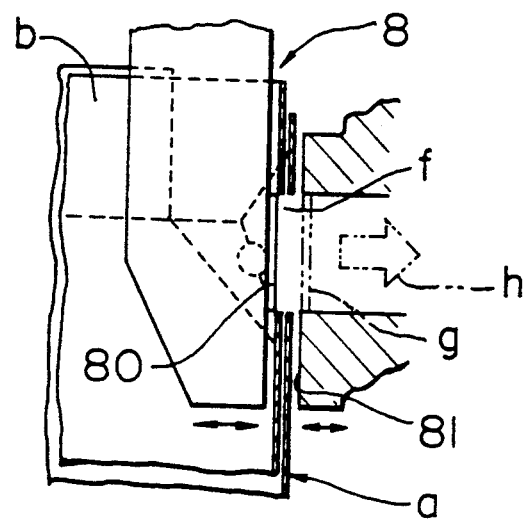
FIG. 6 illustrates a cutting of a spout fitting hole by a punch.

A punch 8 cutting the spout-fitting holes is disposed intermediate the dual inline conveyor D downstream of the deliverer 7. As shown in FIG. 6, the punch 8 comprises a pair of dice 80 and 81 operating for the same tubular blank a. One die 80 descends into the tubular blank from thereabove and the other die 81 concurrently descends in the outside of the tubular blank a. The dice 80 and 81 are opposed to each other at a place corresponding to the spout fitting holes in the tubular blank a and the plastic film b. The dice 80 and 81 meshes each other to punch out the tubular blank a and the plastic film b to form the spout fitting holes f. This punching is performed from the inside to the outside of the tubular blank a. A dust collector or the like draws and removes punching wastes g.

Figure 7:
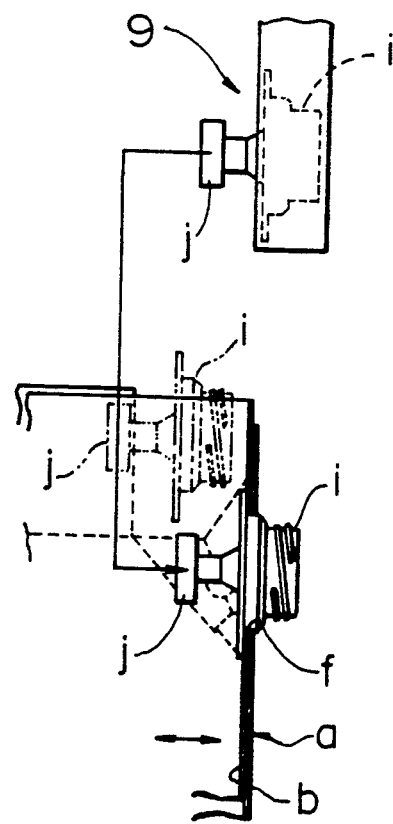
FIG. 7 illustrates a fitting of a spout under a parts feeder.
Figure 8:
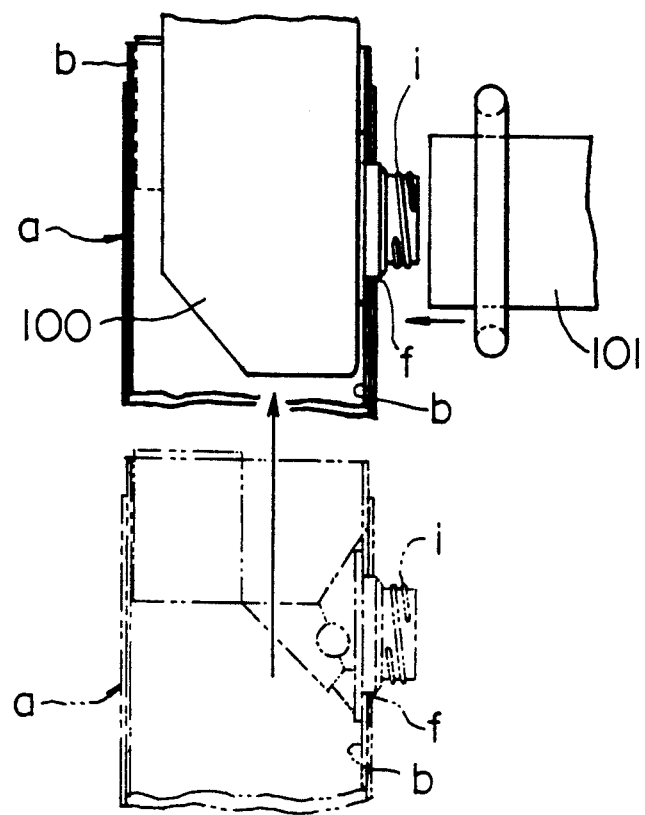
FIG. 8 illustrates an ultrasonic welding of the spout by a spout welder unit.
Figure 9:
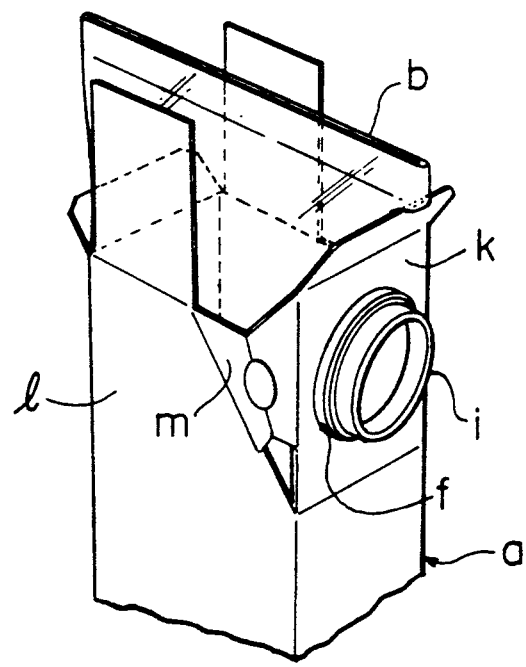
FIG. 9 illustrates an extending of the plastic film by a top film-sealer unit.
Figure 10:
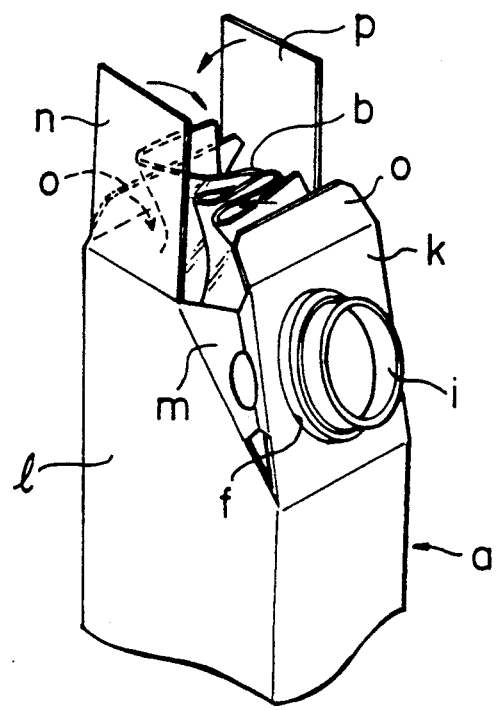
FIG. 10 illustrates a folding of top flaps of a tubular blank.

A parts feeder 9 of a spout feeder unit E is opposed to the dual inline conveyor D downstream of the punch 8. As shown in FIG. 7, an arm j with a vacuum pad sucks a spout i fed at the front end of the parts feeder 9 when the tubular blank a is placed under the spout i and then fits the spout i in the spout fitting holes f in the tubular blank a and the plastic film b from inside the tubular blank a.

The dual inline conveyor D delivers the tubular blanks a to which the spouts i have been temporally fastened, to a spout welder 10. The spout welder 10 comprises a mandrel 100 descending into the tubular blank and an ultrasonic horn 101 pressing a peripheral edge of the spout fitting holes f on a flange of the spout i from outside the tubular blank a. The ultrasonic oscillation of the ultrasonic horn 101 welds the spout i to plastic film b (see FIG. 8).

A deliverer 11 facing perpendicularly to the dual inline conveyor D transfers the pairs of tubular blank a with the spouts i welded from the dual inline conveyor D to a single inline conveyor F. A stream merger 12 provided intermediate the single inline conveyor F aligns the pairs tubular blanks a into a single line during transfer of the pairs of tubular blanks a. A deliverer 13 provided at a downstream end of the single inline conveyor F transfers each tubular blank moving downstream of the single inline conveyor F to the conveyance chain B. A marker unit 14 provided intermediate the conveyance chain B downstream of the deliverer 13 marks a date etc. at a predetermined place in the tubular blank a.

A top film-sealer unit 15 is provided intermediate the conveyance chain B downstream of the marker unit 14. The top film-sealer unit 15 seals the top end of the plastic film b the bottom end of which has been sealed, to finally form the internal bag in the same manner as the bottom film-sealer unit 3. That is, the top film-sealer unit 15 tightly extends the top end of the plastic film b transversely to the longitudinal axis of the tubular blank a and a sealer then closes to seal the top end of the plastic film b.

A folder 16 folding flaps of the tubular blank a with the spout i attached is provided intermediate the conveyance chain B downstream of the top film-sealer unit 15. The folder 16 is employed in a case where an upper tilted plate of a fluid container has the spout i. When the tubular blank a has reached the folder 16, the folder 16 triggers an inward folding of an inward-folded plate m extending between a flap k having the spout i of the tubular blank a and a side plate 1 and completely folds the flap k inward (see FIG. 10).

Figure 11:
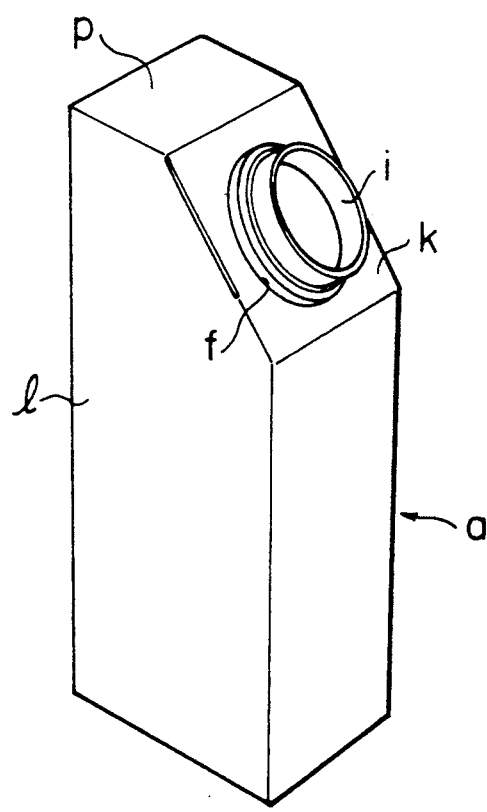
FIG. 11 illustrates one example of a fluid container.

The conveyance chain B then delivers the tubular blank a to a container top wall former 17. The container top wall former 17, as the container bottom wall former 4, folds one large top flap n of the tubular blank a by means of a folding lever and fastens it, while maintaining the form of the tubular blank a, to a small top flap o which has been folded and to which the hot melt adhesive has been applied during movement of the tubular blank a from the folder 16. The container top wall former 17 then folds the other large top flap p to which the hot melt adhesive has been applied over the large top flap thus completely closing the container top wall as shown in FIG. 11.

The fluid containers which have been completed a described above are transferred from the conveyance chain B to a discharge conveyor G and then from the discharge conveyor G to a content filling step, not shown.

Figure 12:
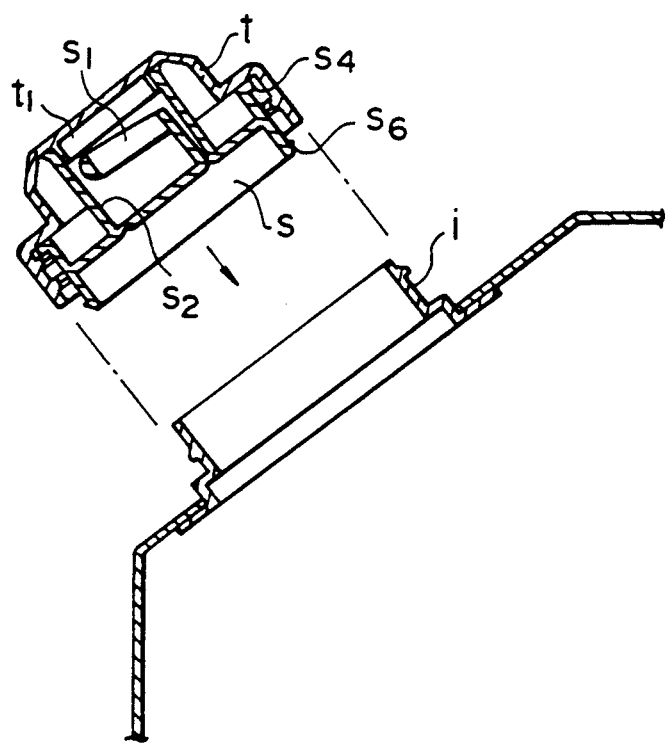
FIG. 12 illustrates a state prior to a fitting of a cap including an internal plug.
Figure 13:
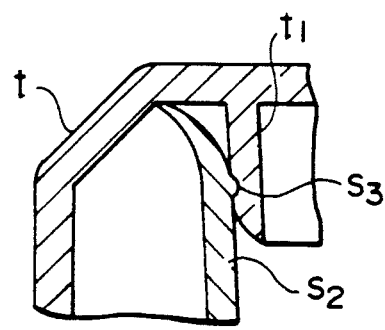
FIG. 13 illustrates a contact of an outlet of the internal plug with an inner ring of the cap.
Figure 14:
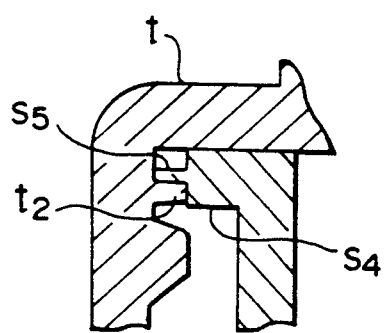
FIG. 14 illustrates an engagement of an outer peripheral flange of the internal plug with the cap.

The spout i according to this embodiment of the present invention is capped and sealed after the fluid container is filled with the content via the spout i. The spout i must have a high liquid-cutting performance in pouring the content or an improved sealing performance at a distribution stage. To this end, a cap t including a preset internal plug s is available. For example, the available internal plug s, as shown in FIG. 12, has a pull-open type structure including a pull ring $s_1$. When the internal plug is preset within the cap t, an annular ridge $A_3$ (associated with an undercut in an inner ring $t_1$) provided on the inner cylindrical surface of the top end of an outlet $s_2$ is in tight contact with the undercut in the outer cylindrical surface of the inner ring $t_1$ of the cap t (see FIG. 13), and a ridge $s_5$ on the outer cylindrical surface of an outward peripheral flange $s_4$ internal plug s removably engages a ridge $t$: on the inner cylindrical surface of the cap t (see FIG. 14). Thus, the fitting of the annular ridge s in the undercut in the inner ring t and the engagement of the ridge $s_5$ with the ridge $t_2$ temporally fix the internal plug s to the cap t to keep the outlet $s_2$ clean.

Figure 15:
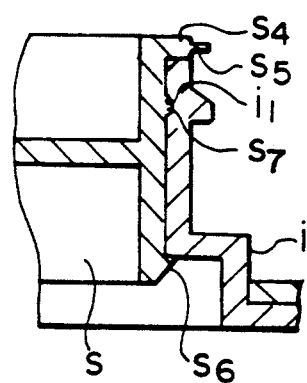
FIG. 15 illustrates an engagement of a hook of the internal plug with the spout.
Figure 16:
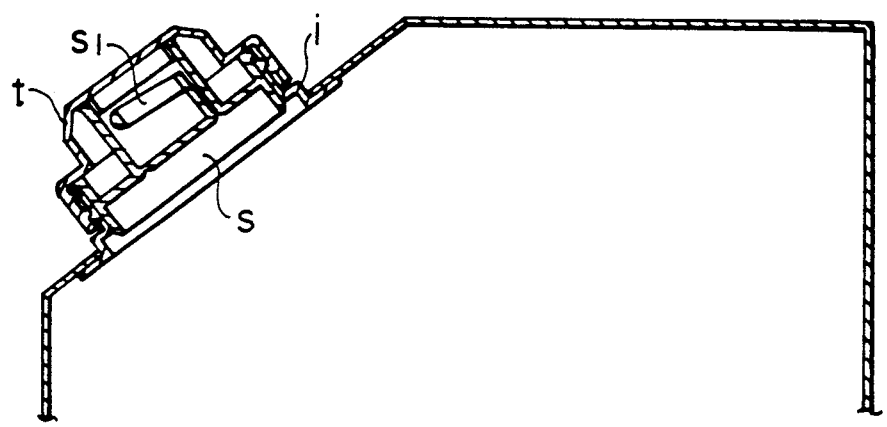
FIG. 16 illustrates a fitting of the cap on the spout.
Figure 17:
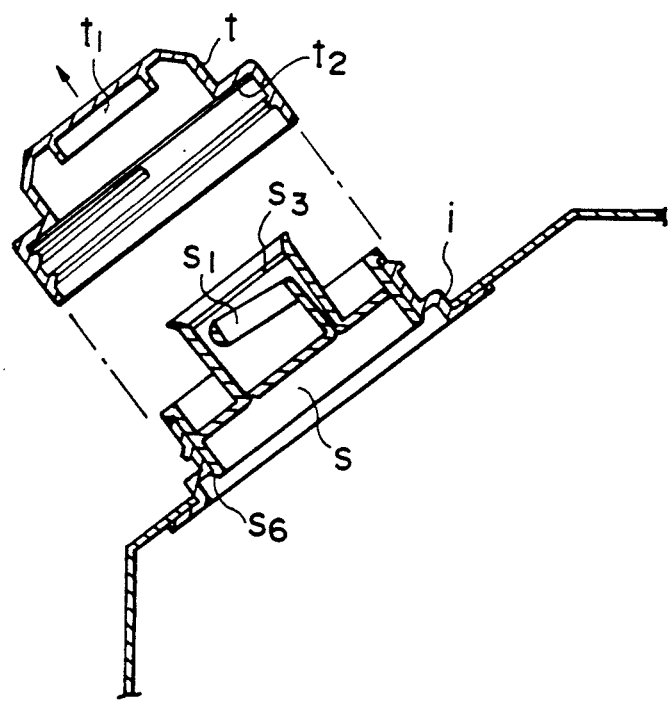
FIG. 17 illustrates a detachment of the cap from the spout.

After the container is filled with the content, the above-described cap t is set on the spout i. The cap t is fitted (i.e. rolling-set) on the spout i to fit the internal plug s in the spout i so that an annular hook $s_6$ provided on the outer cylindrical surface of the bottom end of the internal plug s tightly engages the internal surface of a shoulder of the spout i (see FIG. 15). Thus, the internal plug s is fastened to the spout i (see FIG. 16). In addition, a ridge $s_7$ on the internal plug s, as shown in FIG. 15, fits a groove $i_1$ in the spout i to prevent a leakage of the content. As described above, since the internal plug s is fitted in the spout i, a removal of the cap t securely leave the internal plug s on the part of the spout i.

Figure 18:
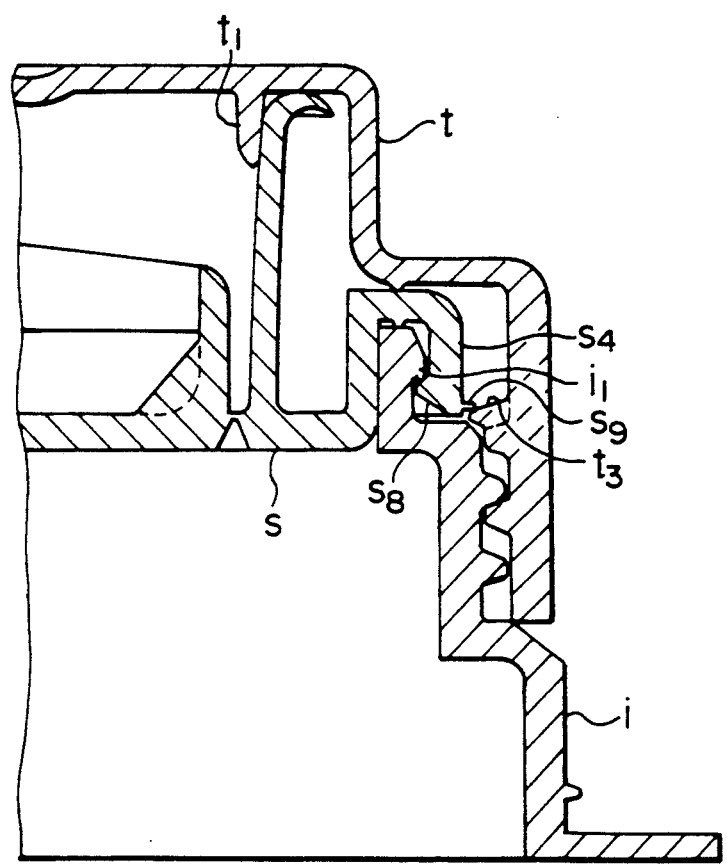
FIG. 18 illustrates a fitting of an alternative cap with an internal plug temporally fastened on the spout.
Figure 19:
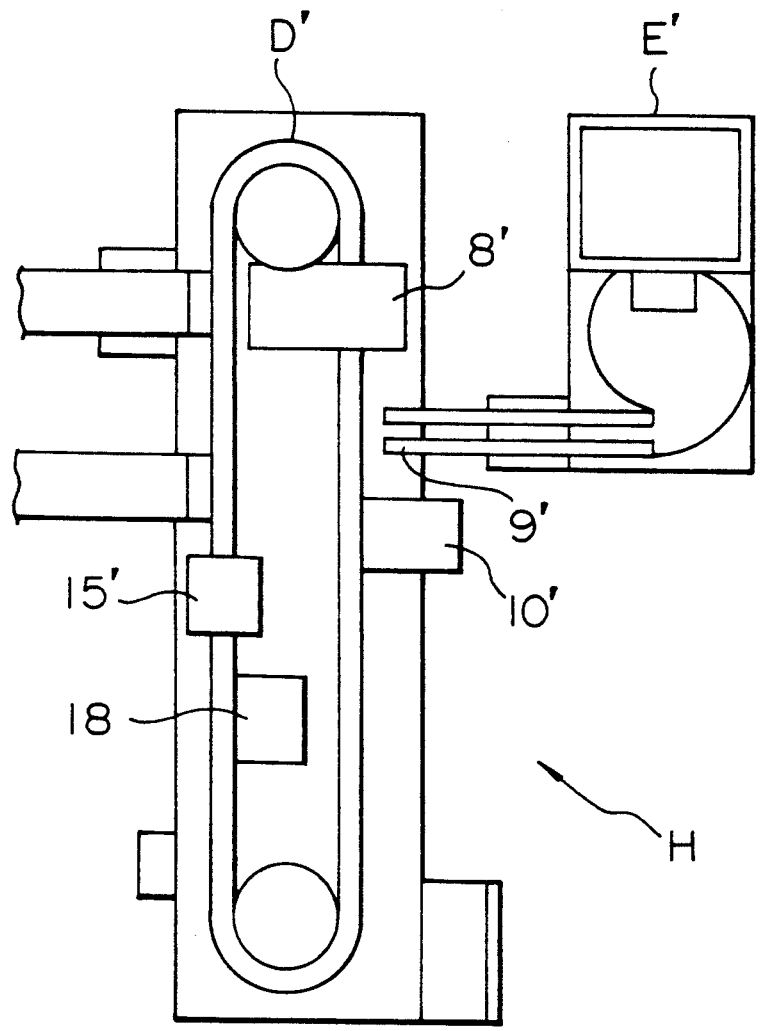
FIG. 19 is a schematic diagram of an essential part of an alternative apparatus of manufacturing a fluid container carrying out a process for manufacturing a fluid container according to a second embodiment of the present invention.
Figure 20:
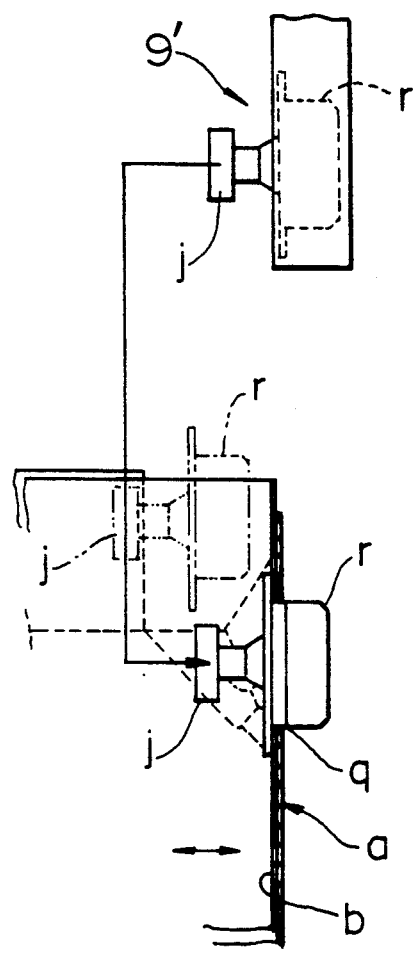
FIG. 20 illustrates a fitting of an outlet plug under a parts feeder of the apparatus of FIG. 19.
Figure 21:
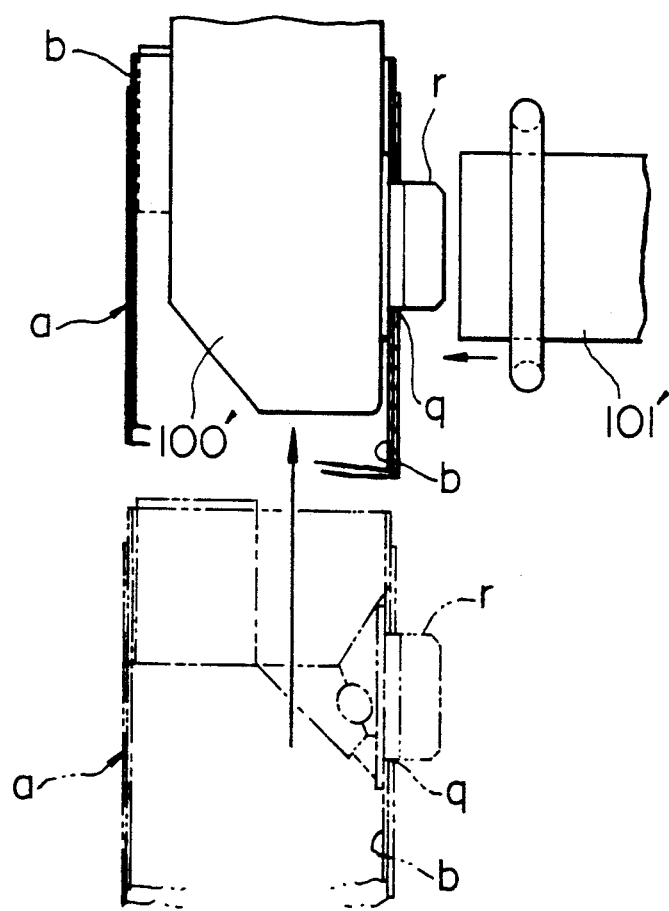
FIG. 21 illustrates an ultrasonic welding of the outlet plug by an outlet plug welder unit.

Structures of the temporal retention of the internal plug s by the cap t and the fitting of the internal plug s in the spout i are not restricted to the structures described above. For example, the structures may comprise an alternative structure as shown in FIG. 18. That is, an internal plug s has an outward peripheral flange $s_4$ with an L-shaped section fitting on the top end of the spout i so that an annular hook $s_8$ on the inner cylindrical surface of the bottom end of the cylindrical portion of the outward peripheral flange $s_4$ engages a hook i on the outer cylindrical surface of the top end of the spout i and so that protrusions $t_3$ on the inner cylindrical surface of the sidewall of the cap t removably engages a protrusion $s_9$ on the outer cylindrical surface of the cylindrical portion of the outward peripheral flange $s_4$ of the internal plug s. Thus, before the cap t is fitted on the spout i, the protrusion $s_9$ of the internal plug s engages the protrusions $t_3$ of the cap t to temporally fix the internal plug s to the cap t. Rolling-setting the cap t on the spout i engages the hook $s_8$ of the internal plug s with the hook $i_1$ of the spout i to securely fasten the internal plug s. The protrusion $s_9$ of the internal plug continues around the outward peripheral flange $s_4$. On the other hand, the protrusions $t_3$ are spaced one another around the sidewall of the cap t.

FIGS. 19-25 illustrate an apparatus H of manufacturing a fluid container having an outlet plug in which, for example, a spout is united with a cap beforehand.

In this manufacturing apparatus H, a feed system feeding the bottomed tubular blank and a discharge system performing the steps of receiving the bottomed tubular blank in which the internal bag has been heatsealed and closing the top wall of the tubular blank are connected to an outlet plug fitting and content filling system cutting an outlet plug fitting holes in the tubular blank and the plastic film, fitting an outlet plug, filling the content and heatsealing the internal bag.

The feed system, as in the first embodiment, comprises a carton stacker unit, a carton feeder unit, a bottom film-sealer unit and container bottom wall former unit (all not shown) and feeds the bottomed tubular to the outlet plug fitting and content filling system blanks. The discharge system comprises a container top wall former unit having the same structure as the container top wall former unit of the first embodiment and closes top walls of tubular blanks in the manner described above when receiving the tubular blanks (described below) in which the top ends of the internal bags have been heatsealed.

The outlet plug fitting and content filling system comprises a punch 8', an outlet plug welder unit 10', a content charger unit 18, and a top film-sealer unit 15' which are arranged sequentially downstream of a conveyor D'. The punch 8' has the same structure as the punch 8 according to the first embodiment. In the structure of the punch 8', one die of a pair of dice descends into a tubular blank from thereabove and the other die concurrently descends in the outside of the tubular blank, and the dice face each other near the position of an outlet plug fitting holes in the tubular blank and the plastic film through a plate of the tubular blank and a plastic film The dice punch out the plate of the tubular blank and the plastic film to form the outlet plug fitting holes g. The punching is performed from the inside to the outside of the tubular blank in the same manner as in the first embodiment. A dust collector draws and removes punching wastes. The punch 8 form the outlet plug fitting holes having a smaller diameter than the spout fitting holes according to the first embodiment.

A parts feeder 9' of a plug feeder unit E' feeding outlet plugs in which spouts and caps are united beforehand faces the conveyor D, downstream of the punch 8'. An arm j having a vacuum pad sucks the outlet plug r which has been fed to the front end of the parts feeder 9' at a time the tubular blank a is positioned under the outlet plug r, and fits the outlet plug r in the outlet plug fitting holes g from inside the tubular blank a.

The conveyor D' delivers the tubular blank a with the outlet plug r temporally fastened, to the outlet plug welder unit 10' downstream of the plug feeder unit E'. The outlet plug welder unit 10' has essentially the same structure as the spout welder unit 10 according to the firs embodiment and welds the outlet plug r which has been fitted in the outlet plug fitting holes to the tubular blank a and the plastic film. The outlet plug welder unit 10' comprises a mandrel 100' descending into the tubular blank a from thereabove and an ultrasonic horn 101' pressing an edge area of the outlet plug fitting holes r on a flange of the outlet plug r from outside the tubular blank a. The ultrasonic oscillation of the ultrasonic horn 101' welds a spout of the outlet plug r to the plastic film b (see FIG. 20).

The conveyor D' delivers the tubular blank a to which the outlet plug r has been attached, to the content charger unit 18. The content charger unit 18 comprises a plurality of charging cylinders 180 and split-fills the intermittently moving tubular blank a with fluids by means of the respective charging cylinders 180 in accordance with the conveyance timing of the conveyor D'. A pair of guides 181 is provided right under each charging cylinder 180 and rotates into their upright positions to open the top flaps of the tubular blank a at a time the tubular blank a has reached a position right under each charging cylinder 180 so as to facilitate a filling of the content.

Since, the top film-sealer unit 15' is provided near the content charger unit 18 so that the tubular blank a reaches the top film-sealer unit 15' soon after the filling of the content is completed, the carton which has been filled with the content is moved through a small distance to prevent a defective sealing due to a shake in the liquid in the carton. The top film-sealer unit 15' opens the large top flaps n and o downwards, deaerates the interior of the internal bag and heatseals the top end of the internal bag. When the tubular blank a has reached the top film-sealer unit 15', a pair of stays 150 provided between the large top flaps n and o moves in the direction of an opening outward of the large flaps n and o so that the top flaps cannot block the heatsealing of the top end of the internal bag.

A clamp 151 moving perpendicularly to and away from the conveyor D' deaerates the interior of the internal bag. Prior to the sealing of the top end of the internal bag, the clamp 150 moves to the tubular blank a and a pair of arms 152 extending forward from the front end of the clamp 150 sandwiches and lightly squeezes the barrel of the tubular blank a. This squeeze raises the level of the content in the tubular blank a. In this state, the top film-sealer unit 15, heatseals the top end of the internal bag and the volume of air in the internal bag is reduced Thus, even if the internal bag is depressed during the closing of the container top wall, the barrel of the container cannot be expanded After the sealing, the clamp 151 releases the tubular blank a and moves rearward away from the tubular blank a.

The sealing of the internal bag is performed in the same manner as in the first embodiment. That is, hooking fingers 153 descend into the top end of the internal bag b of plastic film and extend the top end of the internal bag transversely to the longitudinal axis of the tubular blank a (see FIG. 23). The sealer 154 then descends and starts closing the top end of the internal bag b. At a time a pair of film retainers 155 provided on the opposite sides of the internal bag b has retained the top end of the internal bag b, the hooking fingers 153 remove from the top end and the sealer 154 compresses the top end to completely heatseal the top end.

After the sealing, the sealer 154 removes upwards from the top end of the internal bag b. The conveyor D' then transfers the tubular blank a to the discharge system. The discharge system then closes the container top wall to produce the fluid container having the outlet plug.

The present invention is not rigidly restricted to the embodiments described above. It is to be understood that a person skilled in the art can easily change and modify the present invention without departing from the spirit of the invention defined in the appended claims.

What is claimed is:

1. A method of manufacturing a fluid container, comprising the steps of:
    (a) providing a carton, an internal bag within the carton, and a spout for extending outward from the carton, said carton including a tubular blank arranged in a tubular shape having an opening at an upper wall area, peripheral side walls, and a closed bottom wall, and said internal bag having a plastic film which is contained within said tubular blank;
    (b) punching spout fitting holes in both a wall of said tubular blank of the carton and said plastic film of the internal bag at a predetermined place where the spout is to be attached to the tubular blank and the plastic film;
    (c) fitting the spout in the spout fitting holes from inside the tubular blank; and
    (d) welding the spout to the plastic film.

2. An apparatus for manufacturing a fluid including a carton, an internal bag provided in the carton, and a spout extending outward from the carton, comprising:
    a circulating conveyor means for conveying a tubular blank of the carton, said tubular blank arranged in a tubular shape with an opening at an upper wall area, peripheral side walls, and a closed bottom wall, and said tubular blank containing an internal bag made with a plastic film;
    a punch means for cutting spout fitting holes in predetermined portions of a wall of the tubular blank and the plastic film which have been delivered by said circulating conveyor to a predetermined place;
    means for fitting a spout into said fitting holes of said tubular blank and said plastic film; and
    a spout welder means, provided downstream of said punch means, for welding the spout which has been fitted in the spout fitting holes to the tubular blank and the plastic film which have been delivered by said circulating conveyor to a predetermined place.

3. A method of manufacturing a fluid container, comprising the steps of:
    (a) providing a carton, an internal bag within the carton, and an outlet plug for extending outward from the carton; said carton including a tubular blank arranged in a tubular shape with an opening at an upper wall area, peripheral side walls, and a closed bottom wall, and said internal bag having a plastic film which is contained within said tubular blank:
    (b) punching outlet plug fitting holes in both a wall of said tubular blank of the carton and said plastic film
    (c) fitting the outlet plug in the outlet plug fitting holes from inside the tubular blank;
    (d) welding the outlet plug to the plastic film;
    (e) sealing a top end of the internal bag before filling the internal bag with fluid; and
    (f) filling the internal bag with a fluid via the outlet plug.

4. An apparatus for manufacturing a fluid container including a carton, an internal bag provided in the carton, and an outlet plug extending outward from the carton, comprising:
    a circulating conveyor means for conveying a tubular shape with an opening at an upper wall area, peripheral side walls, and a closed bottom wall and said tubular blank containing an internal bag made with a plastic film;
    a punch means for cutting outlet plug fitting holes in predetermined portions of a wall of the tubular blank and the plastic film which have been delivered by said circulating conveyor to a predetermined place;
    means for fitting an outlet plug into said fitting hole of said tubular blank and said plastic film;
    an outlet plug welder means, provided downstream of said punch, for welding the outlet plug, which has been fitted in the outlet plug fitting holes, to the tubular blank and the plastic film which have been delivered by said circulating conveyor to a predetermined place;
    a heatsealer means for heat sealing the top end of the internal bag in the tubular blank; and
    a charger means for filling the internal bag with a fluid from via the outlet plug; and
    a heatsealer sealing the top end of the internal bag which has been filled with the fluid in the tubular.

5. A method of manufacturing a fluid container, comprising the steps of:
- (a) providing a carton, an internal bag within the carton, and an outlet plug for extending outward from the carton; said carton including a tubular blank arranged in a tubular shape with an opening at an upper wall area, peripheral side walls, and a closed bottom wall, and said internal bag having a plastic film which is contained within said tubular blank;
- (b) punching outlet plug fitting holes in both a wall of said tubular blank of the carton and said plastic film at a predetermined place where the outlet plug is to be attached to the tubular blank and the plastic film;
- (c) fitting the outlet plug in the outlet plug fitting holes from inside the tubular blank;
- (d) welding the outlet plug to the plastic film;
- (e) filling the internal bag with a fluid from above a top end of the internal bag; and
- (f) sealing the top end of the internal bag which has been filled with fluid while in the tubular blank.

6. An apparatus for manufacturing a fluid container including a carton, an internal bag provided in the carton, and an outlet plug extending outward from the carton, comprising:
- a circulating conveyor means for conveying a tubular blank of the carton, said tubular blank arranged in a tubular shape with an opening at an upper wall area, peripheral side walls, and a closed bottom wall and said tubular blank containing an internal bag made with a plastic film;
- a punch means for cutting outlet plug fitting holes in predetermined portions of a wall of the tubular blank and the plastic film which have been delivered by said circulating conveyor to a predetermined place;
- a charger means for filling the internal bag with a fluid from above the tubular blank; and
- a heatsealer means for heat sealing the top end of the internal bag which has been filled with the fluid in the tubular blank.

* * * * *